United States Patent [19]

Koch

[11] 4,360,282

[45] Nov. 23, 1982

[54] FITTING FOR CONNECTING TWO VERTICALLY ABUTTING BODIES OF FURNITURE

[75] Inventor: Gerhard Koch, Motzingen, Fed. Rep. of Germany

[73] Assignee: Hafele KG, Fed. Rep. of Germany

[21] Appl. No.: 242,033

[22] Filed: Mar. 9, 1981

[30] Foreign Application Priority Data

Mar. 12, 1980 [DE] Fed. Rep. of Germany ....... 3009380

[51] Int. Cl.³ .............................................. B25G 3/00
[52] U.S. Cl. ............................ 403/19; 403/DIG. 10; 403/231; 403/322
[58] Field of Search ............... 403/230, 231, 374, 409, 403/406, 407, DIG. 4, DIG. 7, DIG. 10, 19, 322

[56] References Cited

U.S. PATENT DOCUMENTS

| | | | |
|---|---|---|---|
| 3,730,568 | 5/1978 | Giovannetti | 403/231 X |
| 4,131,376 | 12/1978 | Busse | 403/213 X |
| 4,172,316 | 10/1979 | Röck et al. | 403/374 X |
| 4,202,645 | 5/1980 | Giovannetti | 403/DIG. 10 |
| 4,272,207 | 6/1981 | Lautonschläger | 403/407 X |
| 4,325,649 | 4/1982 | Röck | 403/407 X |

*Primary Examiner*—Wayne L. Shedd
*Attorney, Agent, or Firm*—Thomas W. Speckman

[57] ABSTRACT

A connection fitting for detachably securing two vertically abutting bodies of furniture to be connected to each other in their respective regions of contact. One of the two furniture bodies has attached thereto a projecting fastener bolt having a fastening head. The other piece of furniture is provided with a generally cup-shaped enclosure or casing in a cavity to accommodate a rotatably mounted tensioning member. The head of the fastener bolt is in operative connection with the tensioning member and is adapted to be drawn into the casing when the tensioning member is rotated.

14 Claims, 2 Drawing Figures

FITTING FOR CONNECTING TWO VERTICALLY ABUTTING BODIES OF FURNITURE

BACKGROUND OF THE INVENTION

The present invention relates to a fitting for detachably securing two vertically abutting bodies of furniture to be connected to each other in their respective regions of contact. One of the two furniture bodies has attached thereto a projecting fastener bolt having a fastening head. The other piece of furniture is provided with a generally cup-shaped enclosure or casing in a cavity to accommodate a rotatably mounted tensioning member. The head of the fastener bolt is in operative connection with the tensioning member and is adapted to be drawn into the casing when the tensioning member is rotated.

Fittings for connecting abutting bodies are well know, for example, from German Utility Model Nos. 71 42 379 and 71 49 143 and German Pat. No. 17 53 064. In such prior art devices, the tensioning member is provided with a receptacle for a tool, for example, a wrench or a nut driver, for turning the tensioning member, such as for tightening the fitting.

In the prior art fittings, the tensioning member is directly operated by some rotational tool, expending all of the power required for tightening. Moreover, the tensioning angle of the tensioning member is small because the fastener bolt is usually inserted into a radially directed receptacle in the tensioning member. A further disadvantage of the prior art devices is that they have a tendency to inadvertently become loose or disconnected since the self-locking properties between the tensioning surface shape of the tensioning member and the head of the fastener bolt are not sufficiently strong at every tensioning angle of the tensioning member.

SUMMARY OF THE INVENTION

It is an object of the present invention to produce a fitting of the aforementioned type in which substantially greater tensioning forces may be obtained in a simple mechanical fashion, and which nevertheless is in possession of sufficient self-locking forces between the tensioning member and the head of the fastener bolt to prevent inadvertent detachment or loosening of the fitting.

This object is achieved according to the invention by a fitting for disconnectibly joining two vertically abutting pieces of furniture in their region of contact, in which one furniture body is provided with a projecting fastener stud having a fastening head thereon, and the other furniture body is provided with a cup-shaped casing in a cavity enclosing rotatably mounted tensioning means, and in which the head of the fastener bolt is in operative connection with the tensioning means and is adapted to be pulled into the casing by the rotational movement of the tensioning means in which the tensioning means takes the form of a tensioning eccentric having a tensioning sleeve arranged eccentrically to its axis of rotation and extending around and behind the fastening head of the fastener bolt. The tensioning eccentric is accessible from the exposed front side of the casing and the fastener bolt is adapted to be inserted through the side wall of the casing.

In this construction, the eccentric tensioning sleeve is in operative connection over a large area of the fastening head of the fastener bolt and the tensioning distance of the fastener bolt may be translated into a large angle of rotation of the tensioning eccentric. Thus, a small torque at the eccentric will deliver large tightening forces to the fastener bolt, resulting in a substantial easing of the adjustment of the fitting, while yet insuring sufficient self-locking action of the tensioning eccentric with respect to the fastener head.

In order for the fastener bolt to be inserted in a casing provided on a piece of furniture and holding the tensioning eccentric, the tensioning eccentric, the tensioning sleeve in one embodiment of the invention is formed with an opening to receive the head of the fastener bolt.

The large area of engagement between the tensioning eccentric and the fastening head of the fastener bolt may further be enhanced according to another embodiment of the invention by the shank portion of the fastener bolt adjacent the fastening head having a reduced diameter. The fastening head is formed with a tensioning surface positioned at an obtuse angle to the shank section of reduced diameter so that the tensioning eccentric is rotatably mounted in the casing with its axis of rotation at the same obtuse angle to the longitudinal axis of the fastener bolt. The interior wall section of the tensioning sleeve is in abutting relationship with the tensioning surface area on the fastener head and at least partially with the shank section of the fastener bolt. In this manner, the shank section functions as an additional guide element for the fastener bolt along its tensioning path.

In another advantageous embodiment of the present invention, the insertion of the tensioning eccentric into the housing or case, which may be closed at the front side exposed to the viewer, is facilitated by the construction of the casing in the form of two hemispherical or dish-shaped elements, called "half-dishes," adapted to be connected to each other in the region of their plane of separation, by locking means, preferably in the shape of recesses and pins. The axis of rotation of the tensioning eccentric is located in the plane of separation of the casing, so that the eccentric can be positioned in the casing before the casing is put together. If a round shaped casing is involved, the plane of separation extends preferably along a given diameter.

The manufacture of the casing, according to another embodiment of the invention, is simplified and thus more cost-effective by making the two half-dishes constituting the casing of a plastic material joined to each other by a film hinge at one end of the plane of separation to form one piece. The structure is molded in the hinged-out condition by injection molding.

The transfer of forces between the tensioning sleeve of the eccentric and the fastening head of the fastener bolt is optimized in that the interior wall of the tensioning sleeve of the eccentric extends parallel to the axis of rotation of the eccentric, and the front face of the tensioning sleeve is oriented at the same obtuse angle to the interior wall of the tensioning sleeve.

The mounting of the tensioning eccentric inside the casing is accomplished according to another embodiment of the invention in that each half-dish is provided in the region of the plane of separation with semi-cylindrical bearing members for a shoulder of the eccentric and for a guide rib on the circumference of the tensioning sleeve. These bearing elements are formed by portions of the two half-dishes and complement each other to form a cylindrical enclosure when the two half-dishes are assembled to form the complete casing. By means of these portions of the half-dishes, the eccentric is prevented from axial displacement but is rotatably maintained in the assembled casing. Rotational movement of the eccentric will cause the fastener bolt to be drawn in practically free of play or clearance.

According to another embodiment of the invention, adjustment of the fitting is facilitated in that the tensioning eccentric is accessible from the front side of the casing by way of the bearing member. Further, the tensioning eccentric is provided at its accessible side with a tool receptacle, or functions itself as a tool receptacle, with the rotational axis being at the same obtuse angle to the longitudinal axis of the fastener bolt. This facilitates the accessibility to the tensioning eccentric and the application of a tool. Moreover, in an advantageous modification of this embodiment, the bearing shoulder of the tensioning eccentric serves to accommodate the tool receptacle, or is itself in the form of a tool receptacle. Such tool receptacle may take the form of a cross slot, a hexagonal adapter, or the like.

If the fastener bolt is to be secured in a side wall of a furniture body and the casing is to be installed in a compartment bottom, according to a preferred embodiment, the longitudinal axis of the fastener bolt is directed parallel to the front side of the casing. The casing installed in the side wall is provided with an opening for the insertion of the fastening head of the fastener bolt, and the fastener bolt is adjustable in the opening to a limited extent in the vertical direction to its longitudinal axis.

A tentative fixing of the fastener bolt in the casing can be achieved in that the fastener bolt inserted in the casing is prevented from being pulled out by an element of the casing which extends to the rear of the fastening head in an area not covered by the eccentric. In order not to obstruct the insertion of the fastener bolt into the casing, only a part of the casing element extends into the opening in the casing and such part is smaller than the difference between the portion of the opening which is directed transversely to the fastener bolt and the maximum diameter of the fastener bolt.

BRIEF DESCRIPTION OF THE DRAWINGS

The invention will be described in further detail with reference to an illustrative embodiment represented in the drawings, in which.

DESCRIPTION OF PREFERRED EMBODIMENTS

Figure 1:
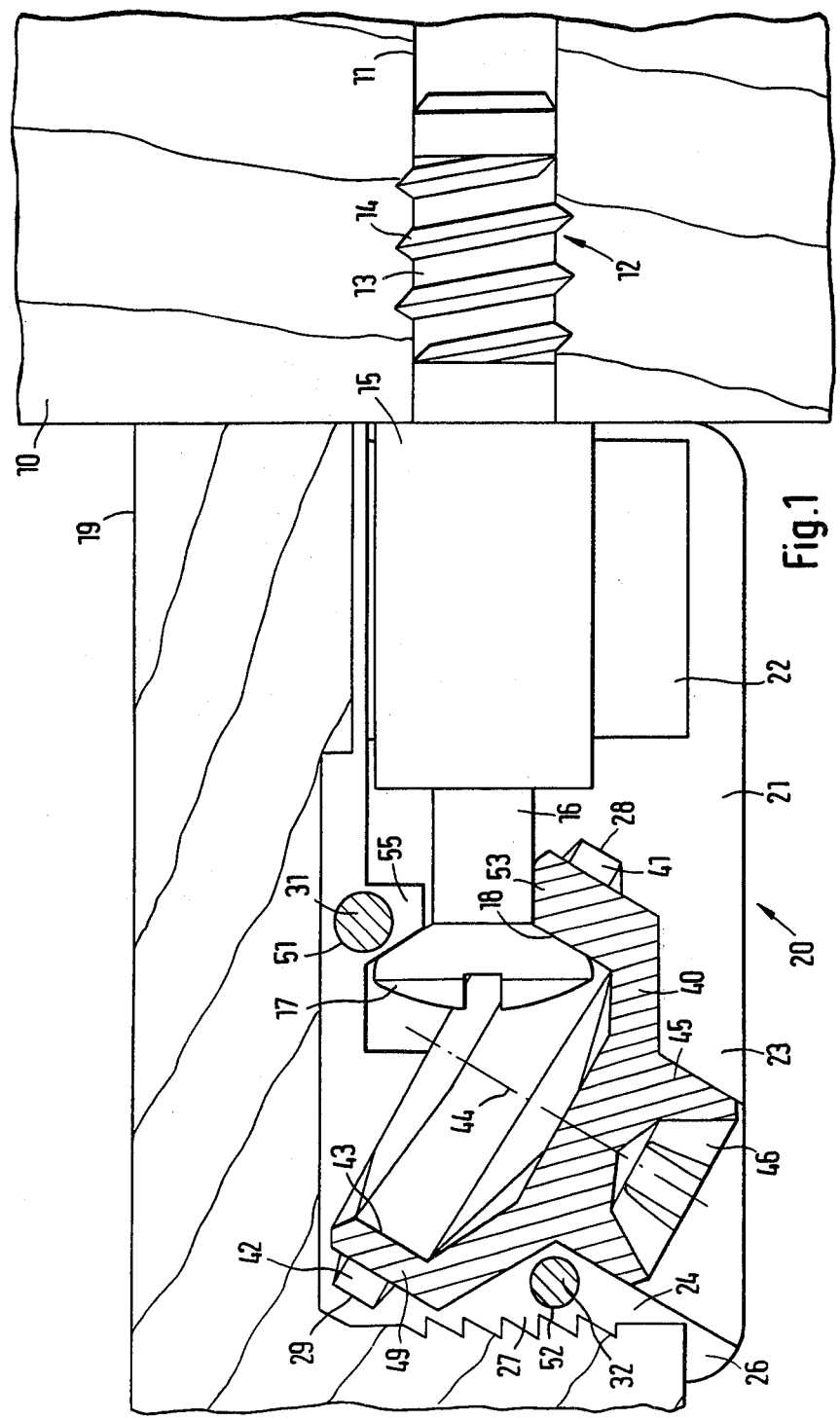
FIG. 1 is a sectional view along the plane of separation of a fitting comprising a casing consisting of two half-dishes and having mounted therein a tensioning eccentric for receiving the head of a fastener bolt, with the casing being installed in a compartment bottom and the fastener bolt being screwed into a side wall of a furniture body.

Referring to FIG. 1, the fastener bolt 12 is screwed into a bore 11 in the side wall 10 of a furniture body, the screw thread 14 on the shank 13 providing sufficient hold. The fastener bolt 12 is screwed into the furniture a distance until the flange 15 abuts the side wall 10. The underside of the compartment bottom 19 is provided with a recess holding a casing 20. The casing 20 consists of two mirror image half-dishes 21 which are joined in the region of their plane of separation by a film hinge to form one piece. To facilitate the molding of the interior configuration of the two half-dishes 21 so as to be able to make these elements with ease from a plastic material in an injection molding process, without using a slide, the two members 21 are molded in their straight or hinged-open condition. The joining of the two half-dishes 21 is effected by locking pins 31 and 32 and recesses 51 and 52 located in the plane of separation of the two half-dishes. The locking means serve to hold the two half-dishes 21 of the casing 20 together; however, actual connection is made only after the tensioning eccentric 40 has been inserted into the casing 20.

The shank section 16 of the fastener bolt which lies between the flange 15 and the head 17 has a reduced diameter and forms an obtuse angle, such as about 120°, with the tensioning surface 18 of the head 17.

As shown in FIG. 1, the two half-dishes 21 form, in the region of the plane of separation, semi-cylindrical bearing elements 25, 28 and 29 for the bearing shoulder 45 and guide ribs 41 and 42 at the periphery of the tensioning sleeve 49 of the eccentric 40. These bearing elements 25, 28 and 29 are constituted by the casing members 23 and 24 and secure the eccentric 40 in the casing to prevent it from axial displacement, while maintaining its rotatability. The tool receptacle 46 in the bearing shoulder 45 of the tensioning eccentric 40 remains accessible from the exposed front side of the casing 20. The eccentric 40 is mounted in a manner such that the tensioning sleeve 49 is eccentrically arranged with respect to the axis of rotation 44 of the eccentric and extends partway around and behind the fastening head 17, with the inner wall 43 of the tensioning sleeve 49 abutting the surface area 18 on the fastening head 17 of the bolt 12. The front face 53 of the sleeve 49 forms an identical obtuse angle to the inner wall 43 of the sleeve 49, so that it will engage the shank portion 16 of the fastener bolt 12 for additional guiding action.

The casing 20 is installed in a cup-shaped cavity in the compartment bottom 19. Detent means in the form of barbs 27 provided on the outer circumference serve to enhance the holding power of the casing in the cup-shaped cavity. The stop 26 serves to limit the turning movement of the casing 20.

The axis of rotation 44 of the tensioning eccentric 40 is at the same obtuse angle to the longitudinal axis of the fastener bolt 12 as the tensioning surface 18 is to the shank section 16 of the bolt 12. Consequently, the axis of rotation of the eccentric 40 is at an acute angle with respect to the side wall of the furniture body, so that a tool may readily be inserted into the tool receptacle 46.

Figure 2:
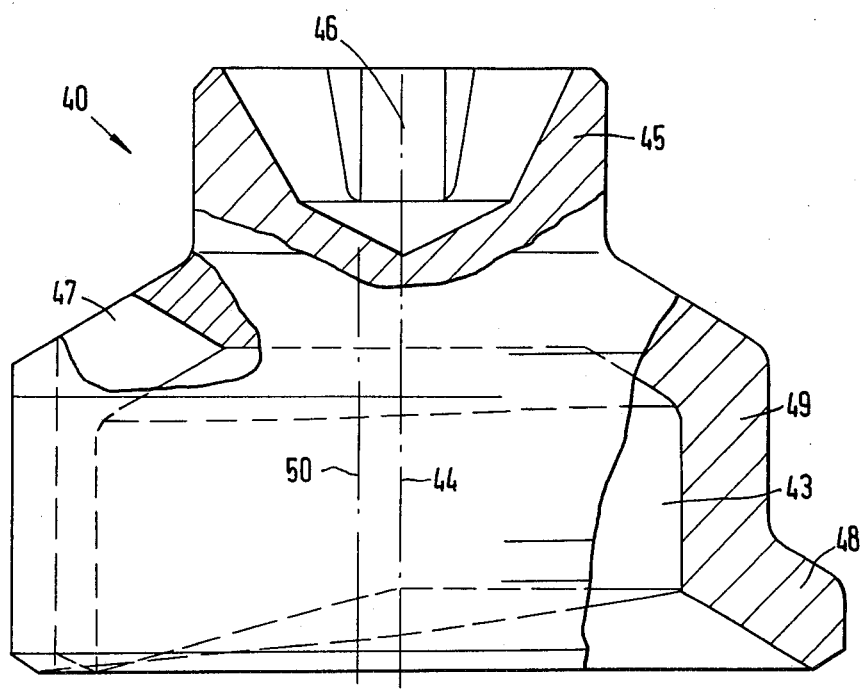
FIG. 2 is an enlarged representation, partly in section, of a tensioning eccentric.

The casing 20 extends up to the front face of the compartment bottom 19 and is provided in this region with an opening 22 for the insertion of the fastener bolt 12. As shown in FIG. 2, also the tensioning sleeve 49 of the eccentric 40 is provided with an opening 47 to receive the fastener bolt 12, so that at a specific rotational position of the eccentric 40 the fastener bolt 12 may also be inserted into the sleeve 49.

The opening 22 in the casing 20 permits a limited adjustment of the fastener bolt 12 in the casing 20 perpendicular to its longitudinal axis. Slightly raising the compartment bottom 19 will permit the fastener head 17 to be inserted into the tensioning sleeve 49 of the eccentric 40, whereby the head 17 is passed beyond the casing element 55. After the fastener bolt 12 has thus been inserted into the casing 20 and the compartment bottom 19 is lowered again, the casing element 55 will be located behind the head 17 of the bolt 12 so that the bolt is prevented from being pulled out. If the eccentric 40 is turned, the sleeve 49 will be placed partly around and behind the fastening head 17 of the bolt 12. The center axis 50 of the sleeve 49 is offset by the amount of eccentricity of the eccentric 40 with respect to the rotational axis 44. Consequently, rotational movement of the eccentric 40 will cause the fastening head 17 of the bolt 12 to be drawn ever more into the casing 20. Thereby will be obtained large tensioning forces between the compartment bottom 19 and the side wall 10, and this by applying but a small adjustment force to the eccentric 40, because the axial tensioning distance of the fastener bolt 12 is translated into a large angle of rotation of the eccentric 40. As is shown in FIG. 2, the guiding action of the tensioning sleeve 49 in the casing 20 may be achieved also by a differently shaped guide strut 48.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. Connection fitting for disconnectibly joining two vertically abutting pieces of furniture in their region of contact, in which one furniture body is provided with a projecting fastener stud having a fastening head thereon, and the other furniture body is provided with a cup-shaped casing in a cavity enclosing rotatably mounted tensioning means, and in which the head of the fastener bolt is in operative connection with the tensioning means and is adapted to be pulled into the casing by the rotational movement of the tensioning means, characterized in that the tensioning means comprises a tensioning eccentric (40) which extends around and behind the fastening head (17) of a fastener bolt (12) by a tensioning sleeve (49) located eccentrically to the axis of rotation (44) of said eccentric, said eccentric (40) being accessible from the exposed front side of said casing (20), and said fastener bolt (12) being insertable through the side wall of said casing (20).

2. Connection fitting according to claim 1, characterized in that said tensioning sleeve (49) is provided with an opening (47) for inserting said fastening head (17) of the fastener bolt (12).

3. Connection fitting according to claim 1, characterized in that said fastening head (17) is adjacent a shank portion (16) of reduced diameter and is provided with a tensioning surface area (18) inclined at an obtuse angle to said shank section (16), that said tensioning eccentric (40) is rotatably mounted in said casing (20) with its axis of rotation (44) at the same obtuse angle to the longitudinal axis of said fastener bolt (12), and that the interior wall (43) of said tensioning sleeve (49) is in an abutting relationship with said tensioning surface (18) on said head (17) and at least partially with said shank section (16) of said fastener bolt (12).

4. Connection fitting according to claim 1, characterized in that said casing (20) comprises two half-dishes (21) adapted to be joined together by locking recesses (51, 52) and locking pins (31, 32) in the region of their plane of separation, and that the axis of rotation (44) of said tensioning eccentric (40) is located in said plane of separation.

5. Connection fitting according to claim 4, characterized in having a round-shaped casing (20) with the plane of separation extending along a diameter.

6. Connection fitting according to claim 4, characterized in that said two half-dishes (21) of said casing (20) are made of a plastic material, are connected at one end of the plane of separation by means of a film hinge to form one piece, and are molded in the hinged-out condition from a plastic material by injection molding.

7. Connection fitting according to claim 1, characterized in that the interior wall (43) of said tensioning sleeve (49) of said eccentric (40) is directed parallel to the axis of rotation (44) of said eccentric (40), and that the front face (53) of said tensioning sleeve (49) is at the same obtuse angle to the interior wall of said tensioning sleeve (49).

8. Connection fitting according to claim 1, characterized in that said casing (20) comprises two half-dishes (21) each of which is formed in the region of the plane of separation with semi-cylindrical bearing surfaces (25, 28, 29) for a bearing shoulder (54) of said tensioning eccentric (40) and a guide strut (41, 42) on the circumference of said tensioning sleeve (49) of said eccentric (40), and that said bearing surfaces (25, 28, 29) are formed by portions (23, 24) of said half dishes (21) which form cylindrical enclosures when said half-dishes (21) are in their assembled condition.

9. Connection fitting according to claim 8, characterized in that said tensioning eccentric (40) is prevented from being axially displaceable by the portions (23, 24) of said half-dishes (21), but is rotatably maintained in the assembled casing (20).

10. Connection fitting according to claim 1, characterized in that said tensioning eccentric (40) is accessible from the front side of said casing (20) by way of the bearing surface (25), and that said eccentric (40) is provided at its accessible front side with a tool receptacle (46) or is itself in the form of a tool receptacle, the axis of rotation (44) being at an obtuse angle to the longitudinal axis of said fastener bolt (12).

11. Connection fitting according to claim 10, characterized in that said tensioning eccentric (40) has a bearing shoulder (45) provided with a tool receptacle (46), or is itself in the form of a tool receptacle.

12. Connection fitting according to claim 1, characterized in that the longitudinal axis of said fastener bolt (12) is directed parallel to the front side of said casing (20), that said casing (20) has an opening (22) in the side wall for insertion of said fastening head (17) of said fastener bolt (12), and that said fastener bolt (12) is adapted to be adjustable in said opening (22) to a limited extent vertical to its longitudinal axis.

13. Connection fitting according to claim 12, characterized in that said fastener bolt (12) inserted into said casing (20) is prevented from being pulled out of said casing (20) by a casing element (55) which extends behind said fastening head (17) on the side not covered by said eccentric (40).

14. Connection fitting according to claim 12, characterized in that only a part of said casing element (55) extends into said opening (22) in said casing (20), said part being smaller than the difference between the extent of said opening (22) which is transverse to said fastener bolt (12) and the maximum diameter of said fastener bolt (12).

* * * * *